United States Patent [19]

Henstrom et al.

[11] Patent Number: 5,778,210
[45] Date of Patent: Jul. 7, 1998

[54] METHOD AND APPARATUS FOR RECOVERING THE STATE OF A SPECULATIVELY SCHEDULED OPERATION IN A PROCESSOR WHICH CANNOT BE EXECUTED AT THE SPECULATED TIME

[75] Inventors: Alexander P. Henstrom, Beaverton; Robert W. Martell, Hillsboro, both of Oreg.

[73] Assignee: Intel Corporation, Santa Clara, Calif.

[21] Appl. No.: 585,361

[22] Filed: Jan. 11, 1996

[51] Int. Cl.$^6$ ........................................... G06F 9/38
[52] U.S. Cl. ........................... 395/394; 395/391; 395/392; 395/800.23
[58] Field of Search ................... 395/800, 392, 395/393, 394, 395, 390, 391, 800.23, 800.26

[56] References Cited

U.S. PATENT DOCUMENTS

| | | | |
|---|---|---|---|
| 5,519,864 | 5/1996 | Martell et al. | 395/391 |
| 5,546,597 | 8/1996 | Martell et al. | |
| 5,553,256 | 9/1996 | Fetterman et al. | 395/800 |
| 5,555,432 | 9/1996 | Hinton et al. | |
| 5,557,763 | 9/1996 | Senter et al. | 395/800 |

OTHER PUBLICATIONS

Johnson, Mike, "Superscaler Microprocessor Design", Prentice-Hall, Inc., Englewood Cliffs, N.J., 1991, pp. i-xxiv & pp. 103-126 (Chapter 6).

Popescu, Val, Merle Schultz, John Spracklen, Gary Gibson, Bruce Lightner and David Isaman, "The Metaflow Architecture", IEEE Micro, Jun. 1991, pp. 10-13 and 63-73.

*Primary Examiner*—William M. Treat
*Attorney, Agent, or Firm*—Blakely, Sokoloff, Taylor & Zafman

[57] ABSTRACT

A method and apparatus for recovering the state of a speculatively scheduled operation in a processor which cannot be executed at the speculated time allows components within the processor to begin the steps of dispatch and execution of operations based on the speculated return of data for the operations at a predetermined time. After these steps have begun for an operation, a signal is received by one or more of these components if the operation cannot be completed at the speculated time. If the operation cannot be completed at the speculated time then the operation is canceled, recovering the state of the operation prior to the beginning of the steps of dispatch and execution.

26 Claims, 8 Drawing Sheets

METHOD AND APPARATUS FOR RECOVERING THE STATE OF A SPECULATIVELY SCHEDULED OPERATION IN A PROCESSOR WHICH CANNOT BE EXECUTED AT THE SPECULATED TIME

BACKGROUND OF THE INVENTION

1. Field of the Invention

The present invention pertains to the field of microprocessor architecture. More particularly, this invention relates to recovering, in a processor, the state of speculatively scheduled operations which cannot be executed at the speculated time.

2. Background

As the computer revolution has progressed the quest of microprocessor developers has been to develop chips exhibiting more power and faster performance. Initial efforts focused essentially on increasing transistor populations on single microprocessor integrated circuits. That effort continues with today's microprocessors now housing literally millions of transistors on a single chip. Further integration has allowed processor clock speeds to be greatly increased with the increased density of transistors.

Given the large number of transistors involved, modern microprocessors are divided into discrete functional blocks through which instructions are propagated one stage at a time. This allows for pipelining of instructions such that when one instruction has completed the first stage of processing and moves on to the second stage, a second instruction can begin the first stage. Thus, even where each instruction requires a number of clock cycles to complete all stages of processing, pipelining provides for the completion of instructions on every clock cycle. This single-cycle throughput of a pipelined microprocessor greatly increases the overall performance of computer systems.

Other enhancements to microprocessor design include the development of superscalar microprocessors which are capable of initiating more than one instruction at the initial stage of the pipeline per clock cycle. Likewise, in a superscalar microprocessor, frequently more than one instruction completes on each given clock cycle. Other development efforts have gone into the simplification of microprocessor instruction sets, developing reduced instruction set (RISC) microprocessors which exploit the fact that many simple instructions are more commonly executed than some complicated instructions. Eliminating the complicated instructions from the instruction set provides for a faster executing pipeline. Complicated instructions are carried out by combinations of the more simple instructions.

Substantial increases in instruction throughput are achievable by implementing out-of-order dispatch of instructions to the execution units of superscalar microprocessors. Many experiments have confirmed that typical von Neumann code provides substantial parallelism and hence a potential performance boost by use of out-of-order execution. Out-of-order execution is possible when a given instruction does not depend on previous instructions for a result before executing. With out-of-order execution, any number of instructions are allowed to be in execution in the execution units, up to the total number of pipeline stages for all the functional units.

In a processor using out-of-order execution, instruction dispatching is stalled when there is a conflict for a functional unit or when a dispatched instruction depends on the result of an instruction that is not yet computed. In order to prevent or mitigate stalls in decoding, previous texts have described the provision of a buffer known as a reservation station (RS) between the decode and execute stages. The processor decodes instructions and places them into the reservation station as long as there is room in the buffer and at the same time examines instructions in the reservation station to find those that can be dispatched to the execution units (that is, instructions for which source operands and execution units are available). Data-ready instructions are dispatched from the reservation station with little regard for their original program order. For further background on the use of reservation stations and out-of-order execution, see Mike Johnson, *Superscalar Microprocessor Design*, Prentice-Hall, Inc., 1991, Chapters 3 and 7.

An additional enhancement to microprocessor performance is the ability to speculatively dispatch instructions from the reservation station. Speculative dispatch allows instructions to be dispatched even though the source operand(s) for the instruction is not available at the time of dispatch. The instructions are dispatched such that by the time an execution unit needs the source operand(s), they will have already been provided by previous instructions.

In a processor providing speculative dispatch, difficulties can arise when the source operand(s) for a speculatively dispatched instruction are not available at the anticipated time. For example, an instruction may be speculatively dispatched based on the anticipated return of data from a previously dispatched memory load operation. If the data returns at the anticipated time, then the processor continues processing without a problem. However, if the data is not returned at the anticipated time (e.g., the load operation misses an L1 cache where the data was expected to be), then the speculatively dispatched instruction cannot proceed until that data is available. The execution unit which is responsible for executing the speculatively dispatched instruction could be stalled until the data is available, however, this would result in unnecessarily preventing other instructions from being executed on that execution unit while waiting for the return of the data. Thus, it would be beneficial to provide a mechanism which allows a processor to speculatively schedule instructions for dispatch and subsequently recover those speculatively scheduled instructions when the data for those instructions is not available at the speculated time.

As will be described in more detail below, the present invention provides for a recovery mechanism that achieves these and other desired results which will be apparent to those skilled in the art from the description to follow.

SUMMARY OF THE INVENTION

A method and apparatus for recovering the state of a speculatively scheduled operation in a processor which cannot be executed at the speculated time is described herein. Components within a processor can begin the steps of dispatch and execution of operations based on the speculated return of data for the operations at a predetermined time. After these steps have begun for an operation, a signal is received by one or more of these components if the operation cannot be completed at the speculated time. If the operation cannot be completed at the speculated time then the present invention cancels the operation, recovering the state of the operation prior to the beginning of the steps of dispatch and execution.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

Figure 1:
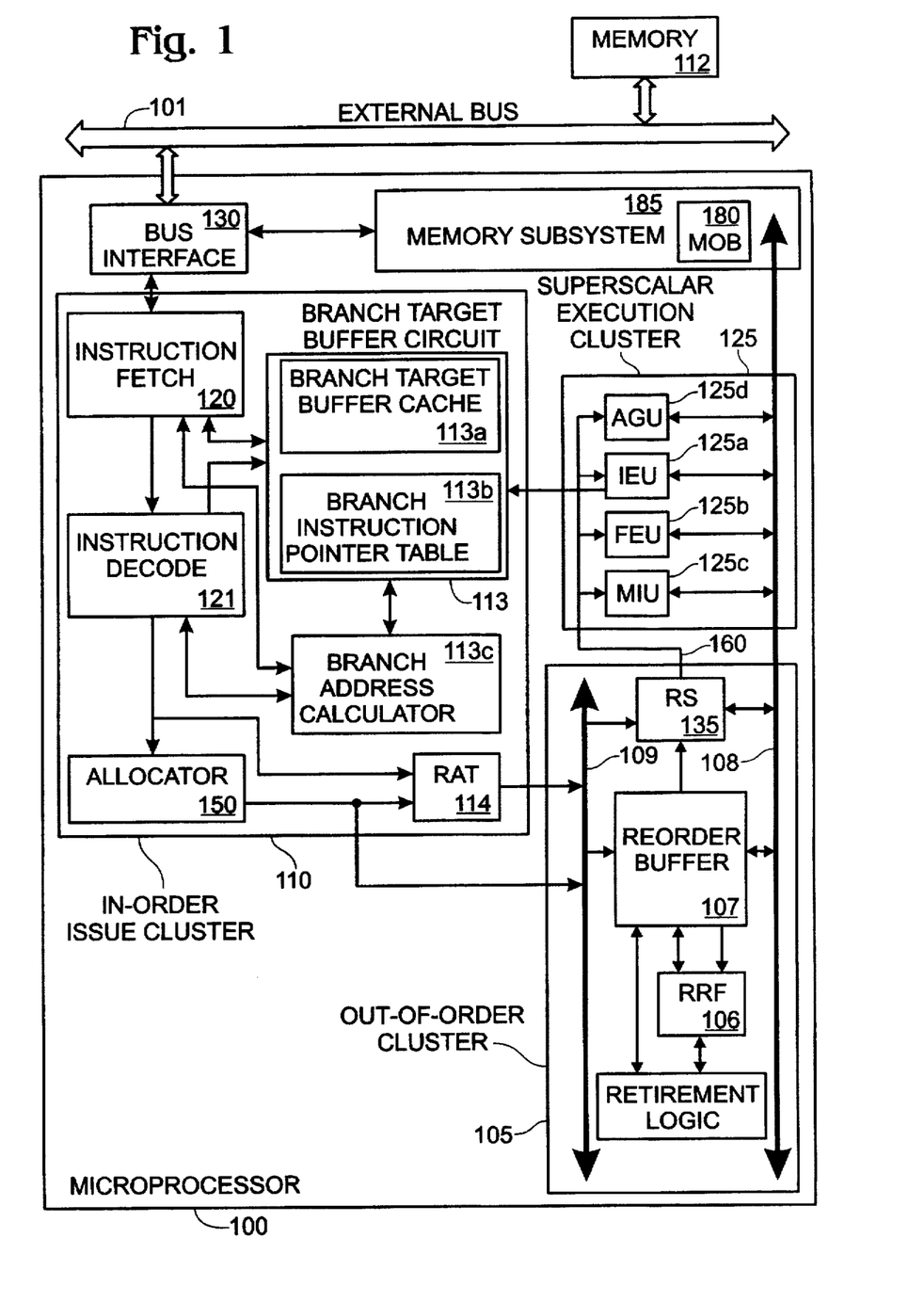
FIG. 1 illustrates a general block diagram of a processor such as may be used with one embodiment of the present invention.

FIG. 1 illustrates a general block diagram of a processor 100 such as may be used with one embodiment of the present invention. The components of the processor 100 are shown in FIG. 1 to provide the general structure and interface of a processor such as may be used with the present invention.

In one embodiment, a microprocessor using the present invention, prior to executing Intel Architecture Microprocessor instructions, decodes them into a more simple, stylized sequence of "micro operations" (micro-ops). The micro-ops are then analyzed and scheduled according to resolved dependencies.

Generally, processor 100 is composed of an in-order portion 110 and an out-of-order portion 105 as shown. The branch target buffer (BTB) circuit 113, BTB cache 113a, branch instruction pointer 113b and the branch address calculator 113c perform speculative instruction execution by predicting program branch results to provide the pipeline with a steady source of instructions. The register alias table (RAT) 114 performs register renaming and is the last stage of the in-order pipeline and subsequent to this stage instructions and association information are placed into the reservation station (RS) 135. Instructions that have been executed and are flowing from the out-of-order portion 105 retire to the real register file (RRF) 106 in program code order if they are determined to be part of a properly predicted program pathway. The reorder buffer (ROB) 107 contains information that may be part of a speculatively predicted branch. The out-of-order cluster 105 schedules operations for execution to the execution cluster 125, receives the results from the computations, and eventually updates the architecturally visible RRF 106 with these results, assuming the computations are part of a properly predicted branch.

An external address and data bus 101, a writeback bus 108, a dispatch bus 160, and an internal bus 109 are also illustrated. The writeback bus 108 carries results of computations from the execution cluster 125 to the reorder buffer 107 which holds the results unit retirement. Dispatch bus 160 carries information relating to instructions dispatched from the reservation station to be executed within the execution cluster 125. Memory for containing instruction and data information is coupled to bus 101 which is coupled to a bus interface unit 130.

The processor of FIG. 1 comprises instruction fetch 120 and decode 121 units with an integrated instruction cache (not shown). These instruction issue units are coupled to the bus interface 130 to receive instructions and data. The bus interface 130 is also coupled to a data cache memory (not shown). The instruction issue units (e.g., fetch and decode) are coupled to an allocator 150 which allocates entries of resource buffers, including the reorder buffer 107 and the reservation station 135. The entries of the reorder buffer 107 become vacant at the time of retirement and the entries of the reservation station 135 generally become vacant at the time of dispatch. The allocator 150 and the instruction issue units are coupled to the reservation station 135 and are also coupled to the RAT 114, which performs register renaming. The RAT 114 is coupled, via internal bus 109, to provide the reservation station 135 with instruction information for subsequent execution. The reservation station 135 is coupled to supply dispatched instruction information to the execution cluster 125, which includes an integer unit (IEU) 125a, a floating point unit (FEU) 125b, a memory unit (MIU) 125c, and an address generation unit (AGU) 125d.

The execution cluster 125 of the processor 100 includes execution units that execute the integer and floating point instructions when their operand dependencies on execution results of preceding instructions are resolved, including those integer and floating point instructions that are speculatively fetched and issued. Similarly, the execution cluster 125 also includes a memory execution unit that executes and dispatches load and store instructions to a data cache memory as soon as their operand dependencies on execution results of preceding instructions are resolved, including those load and store instructions that are speculatively fetched and issued.

The AGU 125d, IEU 125a, FEU 125b, and MIU 125c are all coupled to reservation station 135 via a dispatch bus 160. They are also coupled to writeback bus 108. RS 135 is coupled to the writeback bus 108 and the internal bus 109. The RS 135 is also coupled to ROB 107 and RRF 106. ROB 107 and RRF 106 are also coupled to the internal bus 109 and the writeback bus 108. Together, the above are coupled to hold, dispatch, execute and commit execution results of instructions. The instructions may be dispatched and executed out-of-order. Execution core 125 may include multiple IEUs, such as two, and multiple FEUs, such as two.

In general, the memory ordering buffer (MOB) 180 buffers all store and load operations, and controls dispatching of the load and store operations. In addition, the MOB 180 tracks the progress of memory operations through execution, and retires the memory operations, when appropriate, by committing results to a memory state. Upon retirement of a store operation, the MOB 180 dispatches the store operation in a "background" mode of operation at the convenience of the memory system.

In operation, the instruction issue units 120 and 121 fetch instructions from an external memory, such as memory unit 112, through the bus interface 130 via bus 101. The fetched instructions are stored in an instruction cache (not shown). The bus interface 130 manages transfers of data between external components and the processor 100. In addition, it manages cache coherency transfers. The instruction issue units issue several instructions within a given clock cycle in program code order to the register alias table 114 and the allocator 150.

The allocator 150 according to one embodiment of the present invention interrogates a deallocation vector (generated by the reservation station 135) for vacant entries and from this vector assigns the issued instructions a vacant entry of the reservation station 135 for each micro operation. In one implementation, this interrogation of the deallocation vector to locate the vacant entries of the RS 135 is accomplished very rapidly, and not slower than one clock cycle. The allocator 150 also assigns each incoming micro operation to a vacant location (entry) in the reorder buffer 107, thereby mapping the logical destination address (LDST) of the micro operation to a corresponding physical destination address (Pdst) in the ROB 107. The register alias table 114 maintains this mapping for the most recently renamed logical destination registers. By renaming the registers used by the instructions to a larger set of physical registers that reside in the ROB 107, false data dependencies between instructions may be removed allowing additional parallel execution of instructions.

The out-of-order cluster 105 schedules the instructions for execution depending on data availability and other constraints. When the source data becomes available and an execution unit becomes free, an associated instruction within the reservation station 135 becomes eligible for dispatch to the execution cluster 125. The execution cluster 125 performs arithmetic and logic operations, such functions as add, subtract, logical AND, and integer multiply, as well as memory operations and returns the data to the out-of-order cluster 105. Some instructions are fetched and issued speculatively. The instruction issue units may issue a multiple number of instructions (e.g., 1, 2, or 3) within a common clock cycle. Result data is then stored in the ROB 107.

The contents of a ROB register are retired to a location in a real register file 106 in program code order when the register becomes part of a properly predicted program pathway. The ROB 107 maintains this program code order because the ROB 107 was filled by the in-order cluster 110. Since both the RRF 106 and the ROB 107 can be a source for operand data, the RAT 114 stores a real register file valid bit (RRFV) that indicates whether the value indicated by the logical address is to be found at the physical address in the ROB 107 or in the RRF 106 after retirement. Based upon this mapping, the RAT 114 also associates every logical source address to a corresponding location in the ROB 107 or the RRF 106 (the source operand of one instruction generally must have been the destination of a previous instruction).

Reservation station 135 receives and stores information pertaining to the issued instructions that are pending execution and resolves their operands with data from the IEU 125a, the FEU 125b, the data cache memory (not shown), the ROB 107 and RRF 106 and holds them until their operands are all resolved. The RS 135 then dispatches the issued instructions to the AGU 125d, the IEU 125a, the FEU 125b and the MIU 125c as appropriate. Each incoming micro operation is also assigned and written into an entry in the reservation station 135 by the allocator 150. The reservation station 135 assembles the instructions awaiting execution by an appropriate execution unit, such as integer execution unit 125a. The use of register renaming in the ROB 107 not only avoids register resource dependencies to permit out-of-order execution, but also plays a role in speculative execution since the ROB 107 contains only speculative data. If an instruction sequence is considered to be part of a predicted branch, then the execution of those instructions using the renamed registers in the ROB 107 has no effect on the actual registers denoted by the instruction. Thus, if it is determined that the branch was mispredicted, the results calculated and stored in the ROB 107 may be erased and the pipeline flushed without affecting the actual registers found in the register file 106. If the predicted branch affected the values in the RRF 106, then it would be difficult to recover from branch misprediction because it would be difficult to determine the values stored in the registers before the predicted branch was taken without the use of redundant registers in the ROB 107.

After execution within one of the execution units, when a result is produced, it is written to the ROB 107. The result may provide an input operand to one or more waiting instructions buffered in the reservation station 135, indicating that the source operand is ready for dispatch to one or more execution units along with the instructions using the operand. Generally, the operand data is obtained from the ROB 107 or writeback bus 108 and this information is either forwarded to the appropriate execution units from the reservation station 135 for execution when an instruction is scheduled and dispatched, or bypassed directly to the execution units from writeback bus 108. When the checking logic of the processor determines that a particular instruction is associated with a properly predicted branch, and all other conditions are satisfied, an instruction that has been executed and placed into the ROB 107 may retire. The associated Pdst of that retiring instruction is then written into the RRF 106 and becomes architecturally visible. The IEU, FEU, and the MIU in turn perform their operations accordingly. The execution results of the integer, floating point and load instructions are held in the ROB 107, and then committed to the RRF 106 in strict von Neumann order. Speculative execution results of the mispredicted branches are not committed, but instead are held in the ROB 107 and deallocated upon their retirement.

Regarding the structure of processor 100, the following terminology describes the relevant processing stages of the instructions. The Issue stage refers to the merging of the in-order stream of instructions from the issue cluster with the corresponding source data which is provided by the ROB 107 and then placing this information into the reservation station 135. A set of three, or fewer, instructions are issued within a common clock cycle. Within the issue stage, registers used by the instruction are renamed to registers within the ROB 107 and this renaming occurs within the RAT 114. At the Issue stage, instructions may be part of a speculative program path as a result of a branch prediction.

Also at the Issue stage, instruction information is allocated during two Allocation stages that make up a two cycle allocation pipeline (the allocation is actually performed in one cycle, but is staggered across two clock cycles). During Allocation (e.g., during a given or current allocation cycle), the allocator 150 determines which entries of the reservation station 135 are vacant (e.g., which ones were dispatched previously) and assigns these vacant entries to the set of newly issued instructions. The two pipestage implementation determines which entries are vacant during a current stage (n) and assigns them to micro operations received at the next subsequent stage (n+1).

The Ready/Schedule stage identifies all the instructions ready to execute (Ready stage) that are pending in the RS 135 and selects (Schedule Stage) a group (e.g., by FIFO or similar process) for execution and also schedules an execution unit. For a given clock cycle, not all instructions that are ready may be scheduled. At Dispatch, the scheduled instructions are forwarded to a selected execution (functional) unit. At Writeback, the results generated by the functional units are written into appropriate entries of the ROB 107 and also the RS 135 (if any instructions in the RS 135 are dependent on the results). Also, the writeback ports are examined for results that are sources of instructions pending in the RS 135 so that the data-ready status of these pending instructions may be updated. At Retirement, the results from the ROB 107 that pertain to instructions that are properly predicted and also executed and placed into an architecturally visible buffer (RRF 106) in their original issued order. Upon misprediction, the speculative data in the ROB 107 is cleared.

Figure 2A:
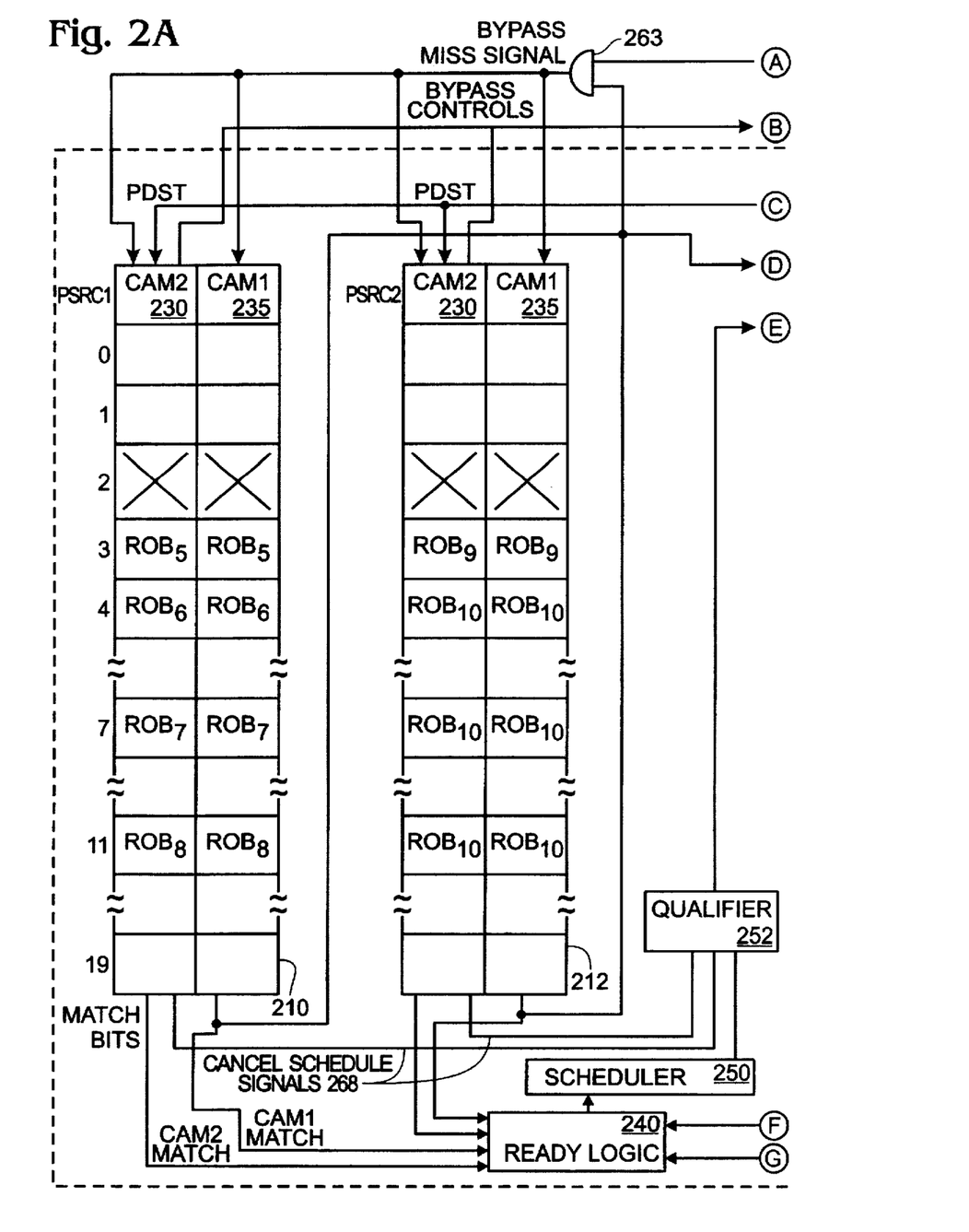
FIGS. 2A and 2B shows a reservation station used by one embodiment of the present invention in more detail.
Figure 2B:
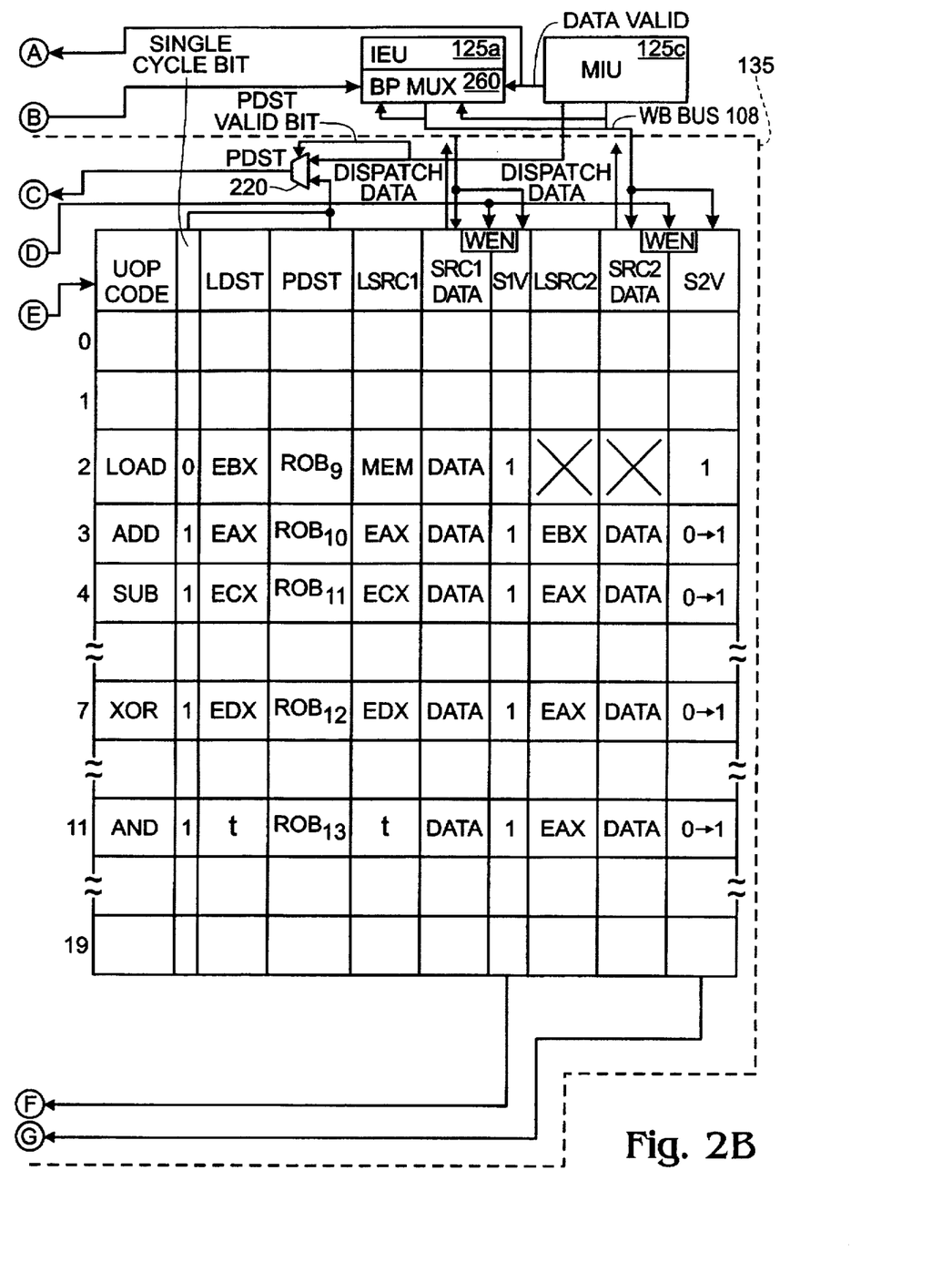

FIG. 2A and 2B shows a reservation station used by one embodiment of the present invention in more detail. Each incoming micro-op is also assigned and written into an entry in the reservation station 135 by the allocator 150. As shown in FIG. 2A and 2B, the reservation station 135 assembles the micro-operations awaiting execution by an appropriate execution unit, such as IEU 125a or MIU 125c. In one embodiment of the present invention, the reservation station is implemented such that twenty micro-ops at one time may be waiting for all necessary resources required for dispatch to an execution unit.

For purposes of illustration, entries 2, 3, 4, 7 and 11 of the RS 135 buffer the micro operations (micro-ops) of the following instruction sequence:

| macro op | micro-op |
| --- | --- |
| LOAD (ebx,mem) | ebx ← load (mem) |
| ADD (eax,ebx) | eax ← add(eax,ebx) |
| SUB (ecx,eax) | ecx ← sub(ecx,eax) |
| XOR (edx,eax) | edx ← xor(edx,eax) |
| AND (t,eax) | t ← and(t,eax) |

Figure 3:
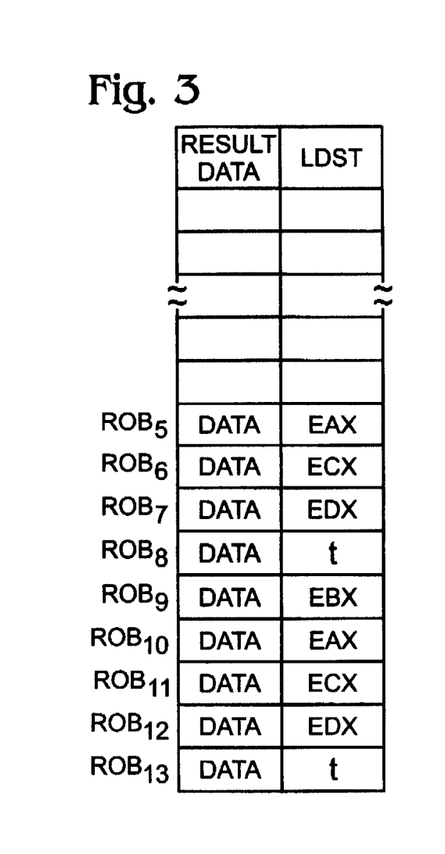
FIG. 3 illustrates a table in a reorder buffer showing the mapping of the logical registers specified by the instruction sequence to physical registers in the reorder buffer.

It is to be appreciated that although the example of FIG. 3 shows the micro-ops being allocated in the reservation station 135 in an in-order fashion, no ordering requirements are placed on the allocation of micro-ops in the reservation station 135. For example, the LOAD, ADD, SUB, XOR and AND micro-ops may be stored in reservation station entries 2, 11, 3, 7 and 4, respectively.

In one embodiment this instruction sequence is fetched from an instruction cache (not shown) by the instruction fetch unit 120 according to predicted instruction pointers from the BTB 103. As an example, the ADD macro instruction is decoded by the instruction decode unit 121 into the micro operation eax←add(eax,ebx) in the Intel microprocessor architecture.

FIG. 3 illustrates a table in the ROB 107 showing the mapping of the logical registers specified by the instruction sequence to physical registers in the ROB. In this example, the first logical source eax register (LSRC1 in FIGS. 2A and 2B) of the ADD instruction, which must contain the result of a prior instruction, is mapped by the RAT 114 to the physical destination address (Pdst) of that prior instruction at ROB entry Pdst=ROB$_5$. Because the logical source register address (LSRC1) of the ADD instruction is the same as the logical destination address (LDST) of the prior instruction, LSRC1 is mapped to a first physical source register address (PSRC1) at the same ROB entry Pdst=ROB$_5$. Similarly, the second logical source register ebx (LSRC2), which also must contain the result of a prior instruction, is mapped to a second physical source register (PSRC2) at ROB entry Pdst=ROB$_9$. The logical destination register address (LDST) of the ADD instruction, also designated by the logical register address eax, is mapped to a physical destination register address (Pdst) at ROB entry Pdst=ROB$_{10}$. Similarly, the other instructions have their logical sources and destinations mapped to physical register identifiers in the ROB 107 by the RAT 114, and their corresponding micro-ops are written into the entries of the reservation station 135. For reasons described below, the physical source register addresses PSRC1 and PSRC2 are stored as tags in content addressable memory (CAM) matching circuitry 210 and 212 for the first and second source operands, respectively. Any number of well known methods and circuits for performing CAM matching of an array of CAM cells against a data input may be used to implement the present invention.

Note that the ADD instruction depends upon the result of the load instruction in that the second source operand of the ADD instruction is stored in the same logical register (ebx) as the result of the load instruction. Similarly, the subtract, exclusive OR (XOR) and AND instructions are dependent upon the ADD instruction in that the ADD instruction writes its results to the eax register, which is the second source operand of those three dependent instructions. For purposes of this example, the ecx, edx and t (temporary) source operand registers are assumed to hold valid data as a result of the execution of previous operations (not shown).

Figure 4:
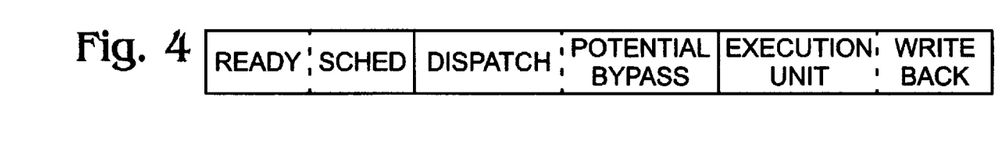
FIG. 4 illustrates pipeline stages supported by one embodiment of the present invention.

After the logical sources and destinations of a micro-op have been mapped to physical sources and destinations, and the micro-op stored at an available entry in the reservation station 135 by the allocator 150, the micro-op is scheduled for dispatch and executed according to the pipeline stages illustrated in FIG. 4. In one embodiment, the pipestages are divided according to processor clock cycles, with the solid vertical lines representing a rising clock edge and the dashed vertical lines representing a falling clock edge.

In general, during the Ready stage, the reservation station 135 determines whether the source operands for a micro-op are available and whether the execution unit for executing that micro-op is also available. If ready, then the micro-op enters the Schedule stage in which the reservation station 135 determines whether multiple micro-ops need to be dispatched for execution by the same execution unit, and, if so, arbitrates among such micro-ops to determine the order in which they are to be dispatched. During the Dispatch stage, the scheduled micro-op is read from its entry in the reservation station 135 and delivered to the scheduled execution unit. As will be described in more detail below, after the dispatch of a micro-op, a Potential Bypass stage is made available in which result data needed by the micro-op may be bypassed directly from the execution unit executing a previous instruction to the execution unit executing the current micro-op. This avoids the necessity of writing the result data to the reservation station 135 or the ROB 107 and then reading the data out as a source operand of the currently executing micro-op, thus increasing instruction throughput.

During the Execution Unit and Write Back stages, a micro-op may then be executed by the scheduled functional unit, and the result data written back from the execution unit into its corresponding ROB 107 entry and into entries of the reservation station 135 that holds micro-ops requiring the result data as a source operand. In addition, as mentioned above, the result data may be bypassed directly to an execution unit requiring the result data. It should be understood that the reservation station pipeline stages that are illustrated in FIG. 4 are but one method of processing an instruction which can be used with the present invention. The present invention is not limited to a processor implementing the pipestages of FIG. 4, but is applicable to any pipelined microprocessor.

Figure 5:
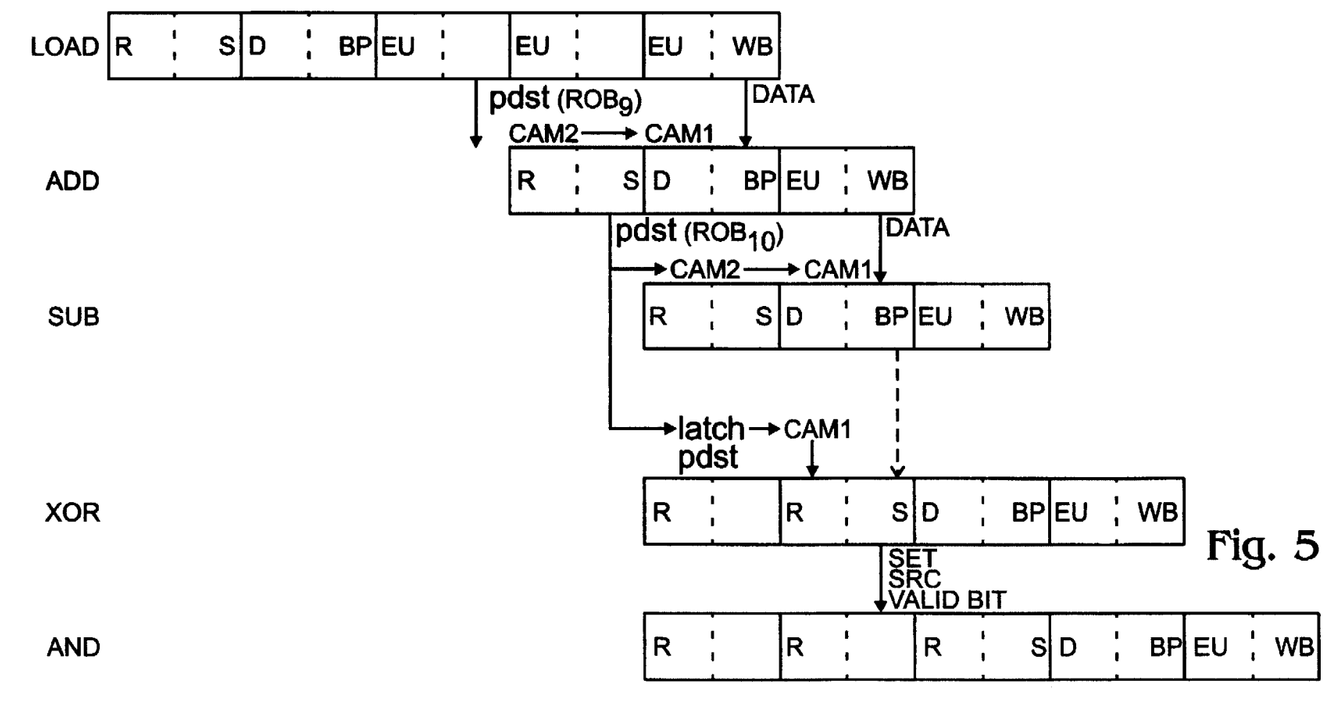
FIG. 5 illustrates an example of the back-to-back scheduling supported by one embodiment of the present invention.

As illustrated in FIG. 5, the pipeline stages of micro-ops are overlapped "back-to-back" in such a way as to achieve maximum execution throughput of the instructions. In processors using the pipestages of FIG. 4, such back-to-back scheduling results in a one cycle throughput. In this example, FIG. 5 illustrates the back-to-back pipelining of the micro instructions of the exemplary micro instruction sequence described above.

In FIG. 5, the load instruction passes through the Ready and Schedule stages, and then is dispatched to the memory execution unit 125c. In this implementation, the execution of a load instruction takes three clock cycles. After execution, the result data, which is to be stored at the logical source register ebx and the corresponding physical destination register ROB₉, is placed on the writeback bus 108 so that it may be written into the appropriate Pdst entry of the ROB 107. The result of the load instruction also provides a source operand for the subsequent add micro-op.

According to one embodiment of the present invention, the memory execution unit 125c provides the Pdst of the result two cycles before writing back the result data. This feature is used to allow the dependent ADD instruction to be scheduled for dispatch early enough to allow for the bypassing of the result data. With respect to scheduling, the Pdst from the memory execution unit 125c is fed through Pdst multiplexer 220 into two-cycle CAM matching circuitry 230 (CAM2), which stores the first and second physical source operand tags PSRC1 and PSRC2. The incoming Pdst is associatively matched with these source operand tags in the CAM 2 arrays. In this example, the Pdst ROB₉ results in a match at entry 3 of the second source operand PSRC2 CAM 2 array, indicating that the second source operand of the ADD instruction will soon become available on the writeback bus 108 from an execution unit. The resulting CAM match bit for entry 3 of the second source operand CAM 2 array is fed into a ready logic circuit 240. As mentioned above, in this example the first source operand (corresponding to eax and located at ROB₅) of the ADD instruction is assumed to be available. In this example, we assume that the availability of the first source operand is indicated by setting a source valid bit (S1V) for the first source operand of the ADD instruction in the reservation station 135. This source valid bit is also fed into the ready logic circuit 240. Using this information, the ready logic circuit 240 determines that a source operand is available for dispatch to the appropriate execution unit along with the corresponding instruction when the following logical equation is satisfied: source ready=[(source valid bit) OR (CAM2 match bit) OR (CAM1 match bit)]

An entire instruction is ready for dispatch when this equation is true for all source operands and an execution unit capable of executing the instruction (as specified by the opcode) is available. (The CAM1 match bit will be described below.) A micro-op scheduler circuit 250 maintains information regarding which execution units are available.

In this example, both the first source valid bit and the second source CAM 2 match bit have been set. Consequently, the ready logic circuit 240 determines that the add micro instruction entry will soon have both of its source operands available so that the instruction may be dispatched if the integer execution unit (IEU) 116 is also available. The ready logic circuit 240 signals the scheduler circuit 250 that entry 3 is ready. In response to this signal, the scheduler circuit 250 will schedule the ADD instruction for dispatch to the integer execution unit 125a.

During the writing of the Pdst by the memory execution unit 125c, the Pdst is latched in the CAM circuitry (latch not shown) and used by one-cycle CAM matching circuitry (CAM1) 235 during the Potential Bypass stage. The latched Pdst is associatively matched with the first and second source operand tags (PSRC1 and PSRC2) that are stored in the CAM1 235 arrays. The CAM1 match again results in a match for the second source operand (PSRC2) of entry 3. As shown in FIG. 2A and 2B, the CAM1 235 match bits are also fed into write enable inputs of the RS 135 to enable the write back of result data to the appropriate source data fields in the reservation station entries for which the Pdst of the write back data resulted in a match. The match bit provides the enables for allowing the writeback valid bit to be sourced into the appropriate data valid bit entries (S1V or S2V). For a number of operations, an execution unit writes the writeback data valid bit at the same time that it writes result data into the corresponding source data field. For example, an execution unit performing a load operation would write back a data valid bit with the data, and not at the earlier time of the CAM match, in order to ensure that data is not prematurely deemed valid before any potential cache misses are resolved. On the other hand, when the result of an instruction, such as an ADD, is inherently certain to be valid, then the valid bit may be preset to valid. Therefore, the valid bit would be set as soon as the corresponding entry is write enabled by the CAM1 235 match bit.

Note that the potential bypass stage of the add micro-op is timed to coincide with the writing back of data from the load micro-op. The match bit resulting from the second source latched two-cycle CAM match is used to control an EU bypass multiplexer 260 in the integer execution unit 116. In response to the bypass controls from CAM2 230, the EU bypass multiplexer 260 routes the result data directly from the memory execution unit 125c to a source operand input of the integer execution unit 125a. Thus, upon receiving the dispatched add micro-op, the integer execution unit 116 has all its source operands immediately available.

The foregoing discussion illustrates how the ADD micro instruction is made ready for dispatch and thereafter dispatched with all its source operands valid. The determination of the readiness of the operations dependent upon the ADD instruction will now be discussed. As mentioned above, the execution unit executing a dispatched instruction provides the Pdst two cycles before writing back the result data. The Pdst is then used to determine the readiness of instructions that depend upon the data to be written back. Here, the ADD instruction is a single cycle micro-op, i.e., the execution/write back stage occurs in a single processor cycle. The ADD is writing back data with a Pdst=$ROB_{10}$, which represents the logical destination register eax. It is desired to achieve back-to-back scheduling of single cycle micro-ops, such as the ADD instruction, and their dependent instructions. This requires that at least one dependent instruction implement its ready pipestage at the same time that the ADD instruction is being dispatched.

However, this mechanism encounters a potential problem when the instruction writing back the data is a single cycle micro-op. Given our discussion above, the Pdst ($ROB_{10}$) for the ADD instruction is returned two cycles before the write back. But in this case for the ADD instruction (as shown in FIG. 5), two cycles before write back occurs is before the ADD instruction is even dispatched. It is impossible for the execution unit 125a to write back the Pdst for the ADD instruction before the ADD instruction is even dispatched. This is the case because it is the act of dispatch that informs the execution unit of the Pdst ($ROB_{10}$) in the first place. Therefore, the Pdst for the ADD instruction is read directly from the RS 135 before the ADD instruction is dispatched. This is referred to as an internally bypassed two-cycle Pdst.

The present invention provides a mechanism for the early reading of the Pdst of a dispatching single-cycle instruction (the internally bypassed two-cycle Pdst) so that the Pdst may be read upon the assertion of a schedule line associated with the dispatching instruction and supplied before the instruction is actually dispatched. The Pdst is written into the RS 135 during allocation of the micro-op to the RS 135. Thus, in this example, after the ADD instruction has been determined to be ready, it is already known that the Pdst in the ADD reservation station entry represents the Pdst of data that will be written back after execution of the ADD instruction. Accordingly, the present invention provides the Pdst bypass multiplexer 220 with the Pdst from the ADD micro-op reservation station entry, and from the multiplexer 220 this Pdst is supplied directly to the CAM2 230 match circuitry of the first and second source operands, thereby bypassing the round trip of the Pdst from the third reservation station entry to the IEU 116 and back again. From the CAM2 230 circuitry, the Pdst is latched into the CAM1 circuitry 235. It is important to realize that the Pdst for the ADD is supplied in advance of the dispatch cycle of the ADD instruction. In one embodiment, a multiplexer 220 is used only for those ports which can execute single-cycle instructions.

To reiterate, the multiplexer 220 provides the Pdst directly from the RS 135, and not from an execution unit, when a single cycle micro-op is to be dispatched. The multiplexing function of the multiplexer 220 may be controlled through a number of methods. First, only those execution units that execute multiple cycle micro-ops are configured to transfer a Pdst Valid bit (PdstV) along with the Pdst two cycles before write back. As shown in FIG. 2A and 2B, the PdstV bit acts as the input selector control of the Pdst bypass multiplexer 220. If the PdstV bit is set (representing a multicycle micro-op), then the Pdst issued by the execution unit is routed to the CAM2 230 circuitry. The PdstV bit is transferred along with the Pdst itself to the CAM2 230 in order to enable and initiate the CAM matching process. If the PdstV bit is not set (representing a single cycle micro-op), then the Pdst from the add micro-op instruction entry of the RS 135 is routed by the multiplexer 220 to the CAM2 230 circuitry, thus bypassing the roundtrip of the Pdst through an execution unit. The multiplexer 220 also routes a "single cycle bit" from the RS 135. The single cycle bit, like the PdstV bit, is used to enable and initiate CAM matching. The single cycle bit is provided as part of the micro-op opcode during the process of decoding a macro instruction into single cycle micro-ops. An alternative method (not shown) of controlling the Pdst bypass multiplexer 220 uses the single cycle bit alone as the multiplexer input selector control.

In this example, the bypassed Pdst of the ADD instruction is fed into the CAM2 230 circuitry to identify dependent instructions. The CAM2 match of the Pdst=$ROB_{10}$ results in matches for the second source operand of entries 4, 7 and 11. The match bit at those entries for the second source operand, along with the already set source 1 valid (S1V) bits for those entries indicates that the subtract, XOR and AND operations are ready for dispatch as soon as execution units are available to execute those functions.

Figure 6:
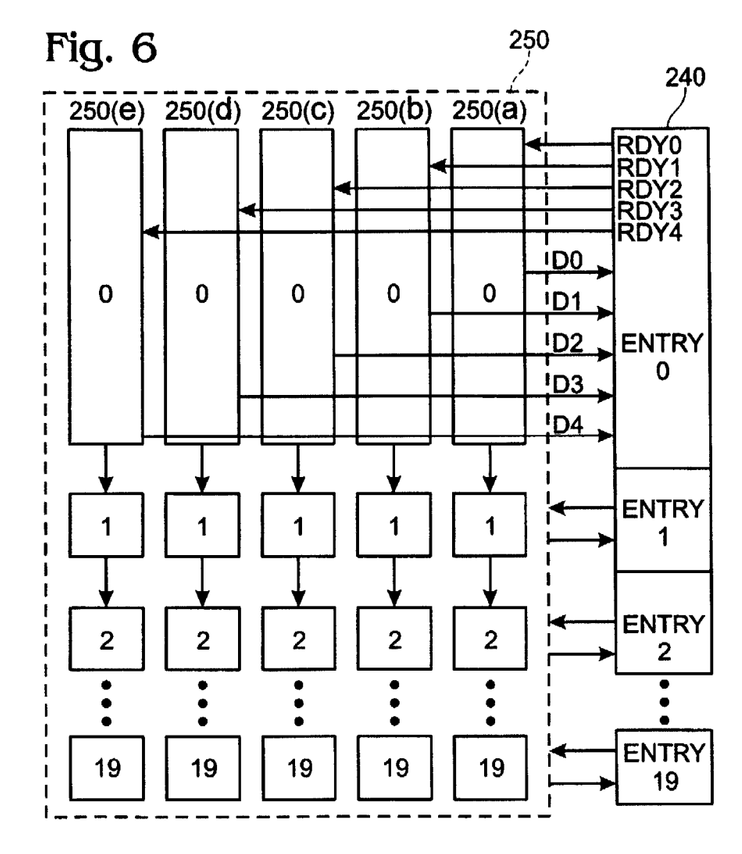
FIG. 6 illustrates a scheduler to ready logic interface in more detail such as may be used with one embodiment of the present invention.

FIG. 6 illustrates the scheduler 250 to ready logic 240 interface in more detail such as may be used with one embodiment of the present invention. A separate scheduler (250(a)–250(e)) is included for each execution port. As shown in FIG. 1 there is an integer execution unit 125a and a memory execution unit 125c and others within the processor with corresponding ports. In one embodiment, the processor contains five execution ports in total (some for performing integer, floating point and other computations) and each execution port has an associated scheduler. Furthermore, in one embodiment multiple execution units can be coupled to a single execution port.

As shown in FIG. 6, a particular entry (e.g., micro-op) of the reservation station 135 may become ready to be scheduled on any one of the schedulers because a given instruction may execute on any given and available execution unit. Therefore, each entry of the reservation station transmits a separate ready line to each individual scheduler (250(a)–250(e)). The ready line generation for entry 0 of the reservation station is shown for all five schedule lines (RDY0–RDY4). Although any given instruction may utilize any of the five execution ports, specific instructions are limited to certain execution ports. Therefore, the purpose of the ready lines, for each entry, is to inform the schedulers to which execution port a given instruction is to be dispatched. It is to be appreciated that each of the twenty entries of the reservation station generate five ready signals. In one implementation, only a single ready signal can be asserted per entry. In an alternate embodiment, it is possible that two or more ready signals, for a given entry, can be asserted assuming that that entry may execute on two or more execution units.

The schedulers decide which of the ready instructions will execute on which execution port. The schedulers, for each entry of the reservation station 135, send five dispatch signals (D0–D4) back to the ready logic 240 of the reservation station 118. The dispatch lines for entry 0 are illustrated in FIG. 6 and it is appreciated that five equivalent lines are provided for each other entry 1, 2, . . . 19 of the reservation station. Each dispatch signal refers to a separate execution port that has been selected by the applicable scheduler. The dispatch signals D0–D4 are individually generated by schedulers 250(a)–250(e), respectively. These dispatch signals are asserted during the schedule stage for a given instruction and are often referred to as "schedule signals" for a given entry of the reservation station. For a given entry of the reservation station, only one of the five dispatch signals will be asserted at any given time. For instance, if entry 0 is scheduled to execute upon execution port 0, then the dispatch line (D0) for entry 0 will be asserted and forwarded from the scheduler 250(a) to the reservation station entry zero. In sum, a given entry of the reservation station has five associated dispatch (schedule) lines and only one can be asserted at any given time. These schedule lines (D0–D5) are used during the early reading of Pdst's from the reservation station for scheduling instructions that follow single cycle micro-ops, as will be discussed immediately below.

It should be kept in mind that the preferred embodiment of the present invention is a superscalar microprocessor, i.e., multiple instructions may execute within the same processor clock cycle. Thus, in the example of FIG. 2A and 2B, both the first and second operands may become available at the same time due to the simultaneous execution of multiple instructions providing both operands. To accommodate the superscalar case, each CAM of FIG. 2A and 2B may represent a multi-ported CAM that receives a Pdst from each micro instruction that will be writing back its result.

The MIU 125c retrieves data from memory subsystem 185 of FIG. 2. Memory subsystem 185 accesses the various memory levels (e.g., caches and main memory) to retrieve the data requested by MIU 125c. If necessary, memory levels can be accessed via bus interface 130 and external bus 101. It is to be appreciated that the present invention can utilize multiple levels of caches. For example, a system may include an L1 cache and an L2 cache. In one embodiment, data is always retrieved by MIU 125c from an L1 cache. If a load request from MIU 125c results in a memory miss to the L1 cache, then memory subsystem 185 accesses the L2 cache (or main memory, etc.) in order to bring the requested data into the L1 cache.

A processor typically first attempts to retrieve data from the L1 cache. If the data is not in the L1 cache, then the processor attempts to retrieve the data from the L2 cache. If the data is not in the L2 cache, then the processor retrieves the data from either main memory (if it is there), or from a data storage device (e.g., a disk drive). The MIU 125c returns a data valid signal to the other execution units when returning valid data. Thus, each execution unit knows that a memory miss occurred if the data valid signal is not received at the anticipated time.

A load micro-op can result in a memory miss from any one of the multiple memory levels (e.g., L1 cache, L2 cache, main memory, disk drive, etc.). A memory miss at a particular level refers to the requested data not being available in that particular level.

Figure 7:
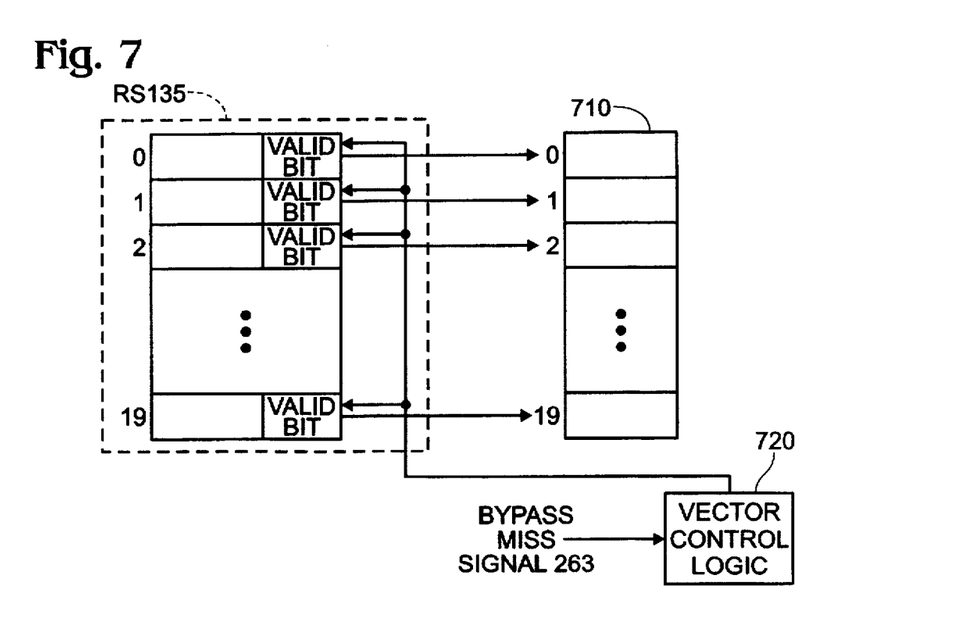
FIG. 7 is a diagram showing a reservation station array and a deallocation vector according to one embodiment of the present invention.

FIG. 7 is a diagram showing a reservation station array having 20 entries and a deallocation vector according to one embodiment of the present invention. In one embodiment, each entry of RS 135 includes a valid bit indicating whether the entry has a valid instruction or is able to accept a new instruction. These valid bits are read out each clock cycle to generate the deallocation vector 710, which is then provided to the allocator 150. The deallocation vector 710 is made up of the same number of entries as the reservation station array and is only one bit wide. Each entry of the deallocation vector 710 is considered a pointer to a corresponding entry with the same number of the reservation station array. Deallocation vector 710, for a given clock cycle, indicates which of the entries of reservation station 135 are vacant (e.g., ready to accept new instruction data) and those that are filled (e.g., may not accept instruction data on this clock cycle). In one implementation, a "0" marked in the valid bit of an RS 135 entry indicates that the associated entry in the reservation station is vacant and may accept new instruction data.

When an instruction is dispatched from an entry of reservation station 135, its corresponding entry valid bit is cleared by instruction scheduler 250. In one embodiment, this clearing of valid bits is done at the end of each dispatch stage. Similarly, when an instruction is allocated to an entry of the reservation station 135, its corresponding valid bit is set by allocator 150. Vector control logic 720 asserts signals to override the clearing of the appropriate valid bits of RS 135 if a speculatively dispatched operation should not be cleared, as discussed in more detail below.

A microprocessor in accordance with the present invention speculatively dispatches memory load micro-ops as discussed above. If the data for the load is not contained in the expected memory location (e.g., in the L1 cache, the L2 cache, etc.), then the data from the load micro-op will not be available at the speculated or predetermined time (in the writeback stage) as anticipated. Thus, the data cannot be bypassed into the execution unit(s) as expected, thereby resulting in a bypass stage miss. The present invention provides a mechanism to recover from the situation where a speculatively dispatched memory load results in a bypass miss. Generally, any micro-ops that have been speculatively scheduled based on the speculated return of data from the memory load are returned to the state they were in prior to being scheduled (e.g., control information is changed, if necessary, to indicate they were not scheduled and dispatched). In one embodiment, several different situations exist which may require the recovery of the state of a micro-op. These different situations are shown below in FIGS. 8–12.

In one embodiment, a separate bypass miss signal is generated for each port from reservation station 135. A bypass miss signal 263 corresponding to the port for IEU 125a (e.g., port 0) is shown in FIG. 2A and 2B. The bypass miss signal 263 is generated by logically ANDing together the data valid signal from MIU 125c and the CAM match bits being input to bypass multiplexer 260. If the CAM match bits being input to bypass multiplexer 260 indicate that the IEU 125a is to receive bypass data, and the data valid signal from MIU 125c indicates that the data from MIU 125c is not going to be available at the anticipated time, then a bypass miss occurred for port 0, resulting in the bypass miss signal 263.

Figure 8:
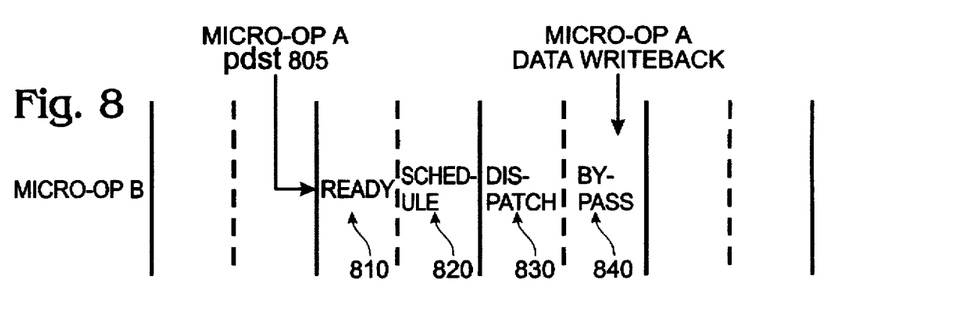
FIG. 8 shows an example of a micro-op which has been issued based on a speculatively issued load micro-op according to one embodiment of the present invention.

FIG. 8 shows an example of a micro-op which has been issued based on a speculatively issued load micro-op according to one embodiment of the present invention. As discussed above, the Pdst of a micro-op is supplied two cycles before the writeback of the data to the Pdst. In FIG. 8, a Pdst 805 for a micro-op A is shown. The data corresponding to Pdst 805 is the remaining source data necessary for the dispatch of micro-op B. In the embodiment shown in FIG. 8, micro-op B is a multi-cycle micro-op, such as a load micro-op. Given the provision of Pdst 805, micro-op B is ready for dispatch 810 in the first half of the clock cycle following Pdst 805. Micro-op B is then scheduled for dispatch 820, and dispatched 830 as shown over the proper dispatch port to the proper execution unit. The execution unit which receives micro-op B then expects a data bypass 840. The data bypass 840 is the expected writeback data from the execution unit which provided the Pdst 805 (MIU 125c in this example).

However, if micro-op A results in a memory miss, then the data will not be ready for micro-op B in time for data bypass 840. Therefore, micro-op B is not completed at the present time and is canceled. In order to cancel micro-op B, the present invention prevents the entry in the reservation station 135 which contained micro-op B from being deallocated. In one implementation, micro-op B is prevented from being deallocated by overriding the clearing of its valid bit, resulting in the deallocation vector 710 indicating that the entry is still filled. Thus, the reservation station 135 maintains micro-op B so that it can be re-scheduled at a later time.

In one embodiment, the vector control logic 720 of FIG. 7 receives the bypass miss signal 263. The bypass miss signal 263 indicates, as discussed above, that the expected data was not received in the writeback stage as anticipated. Thus, the bypass miss signal 263 causes the vector control logic 720 to set the appropriate valid bit in RS 135, thereby preventing the scheduler 250 from believing that the entry in reservation station 135 is available.

It should be noted that the source valid bit in the reservation station 135 is set (for a load) by writeback when the data is available. Micro-op B, however, was scheduled because a CAM match bit was input to the ready logic. Therefore, the source valid bit does not need to be cleared in the reservation station 135 entry because it was never set.

It should also be noted that an execution unit receives, along with the data and the micro-op, a valid bit indicating that the information being received is valid. The bypass multiplexer 260 at the execution unit 125a clears, at the potential bypass stage 840, the micro-op valid bit upon receipt of the data invalid signal. Thus, the execution and writeback stages do not complete for micro-op B because the execution unit does not believe it has received a valid micro-op.

Figure 9:
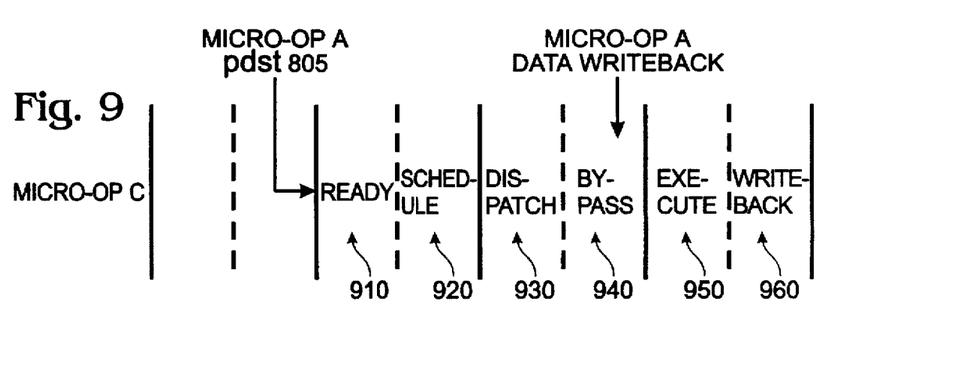
FIG. 9 shows another example of a micro-op which has been issued based on a speculatively issued load micro-op according to one embodiment of the present invention.

FIG. 9 shows another example of a micro-op which has been issued based on a speculatively issued load micro-op according to one embodiment of the present invention. In the embodiment shown in FIG. 9, micro-op C is a single-cycle micro-op, such as an add micro-op. A Pdst 805 for a micro-op A is shown, with the data corresponding to Pdst 805 being the remaining source data necessary for the dispatch of micro-op C. Given the provision of Pdst 805, in the first half of the clock cycle following Pdst 805, micro-op C is ready for dispatch 910. Micro-op C is then scheduled for dispatch 920, and dispatched 930 as shown over the proper dispatch port to the proper execution unit. The execution unit which receives micro-op C then expects a data bypass 940. The data bypass 940 is the expected writeback data from the execution unit which provided the Pdst 805.

However, if micro-op A results in a miss to the L1 cache, then the data will not be ready for micro-op C in time for data bypass 940. Therefore, micro-op C cannot be completed and should be canceled. In order to cancel micro-op C, the present invention prevents the entry in the reservation station 135 which contained micro-op C from being deallocated. This is done in an analogous manner as was done for micro-op B discussed above with reference to FIG. 8.

It is to be appreciated that execute stage 950 and writeback stage 960 for micro-op C will not be completed at this time.

Figure 10:
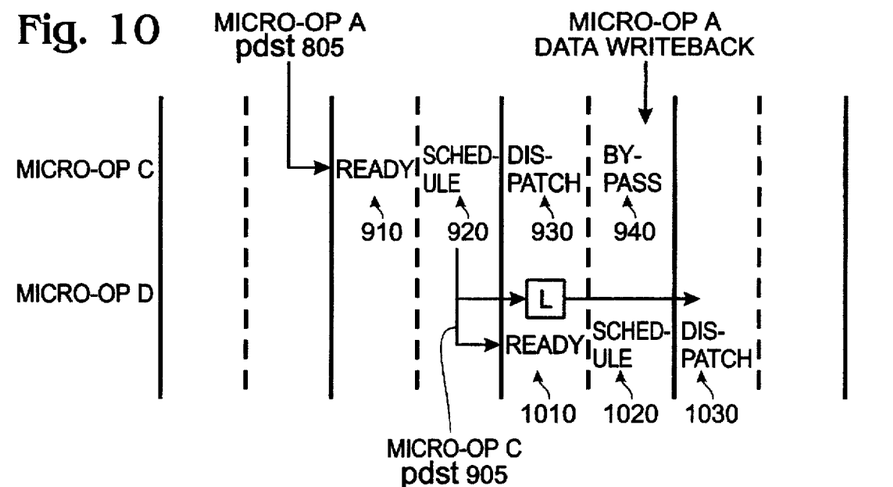
FIG. 10 shows another example of a micro-op which has been issued based on a speculatively issued memory load micro-op according to one embodiment of the present invention.

An additional problem can also arise when the entry which is prevented from being deallocated contains a single-cycle micro-op. This situation is shown in FIG. 10. Since the Pdst for a micro-op is provided two clock cycles before the writeback stage for the micro-op, then the Pdst 905 that micro-op C (a single-cycle micro-op) is providing should be provided during the schedule stage 920 for micro-op C. The data corresponding to Pdst 905 is the remaining source data necessary for the dispatch of micro-op D. Thus, micro-op D is ready for dispatch 1010 and scheduled for dispatch 1020. As shown in FIG. 10, the data bypass stage 940 of micro-op C occurs at the same time as the schedule stage 1020 of micro-op D.

At the schedule stage 1020 of micro-op D, the data being provided by micro-op A is not available. Thus, micro-op C is canceled, as discussed above. In addition, since micro-op D is scheduled based on the availability of the resultant data from micro-op C, then micro-op D should also be canceled.

In order to cancel micro-op D, the present invention prevents micro-op D from being dispatched. In one embodiment, a micro-op is prevented from being dispatched by a cancel schedule signal, as shown in FIG. 2A and 2B. The cancel schedule signal is generated based on the receipt of the bypass miss signal 263. The bypass miss signal 263 is input to the CAM circuitry as shown. The bypass miss signal 263 is then compared with the two-cycle CAM match for that clock cycle. If the two-cycle CAM match produces a match (based on the receipt of bypass miss signal 263), then the cancel schedule signal 268 is asserted.

Qualifier 252 uses the cancel schedule signals 268 to qualify the schedule signals output to the entries of the reservation station 135 from scheduler 250. In one implementation, this is done by logically ANDing together the cancel schedule signal 268 and the schedule signals. If any one or more of the cancel schedule signals 268 is asserted, then qualifier 252 prevents the schedule signal from being output to the reservation station 135. Thus, even if scheduler 250 identifies a particular micro-op as the one to be dispatched, the cancel schedule signal 268 overrides that determination, preventing the micro-op from being dispatched yet.

Additionally, the two-cycle Pdst is latched (L) and will be used in the next clock cycle for a CAM match in the CAM1 circuitry, as discussed above. However, the data bypass stage 940 cannot be completed because the data for the bypass is not available due to the bypass miss. Thus, the Pdst for micro-op C is not going to be available at the expected time and the internally bypassed two-cycle Pdst which was latched should therefore be cleared. By clearing this latched Pdst in the reservation station, the present invention prevents the scheduling of later micro-ops based on the internally bypassed two-cycle Pdst.

In one embodiment, the bypass miss signal is used to clear the latched two-cycle Pdst. A Pdst valid bit is input to the CAM2 230 and CAM1 235 circuitry to enable and initiate the CAM matching process. The bypass miss signal 263 causes the Pdst valid bit for the CAM1 235 circuitry to be cleared. In one implementation, this is done by logically ANDing together the bypass miss signal 263 and the Pdst valid bit for single-cycle micro-ops.

Figure 11:
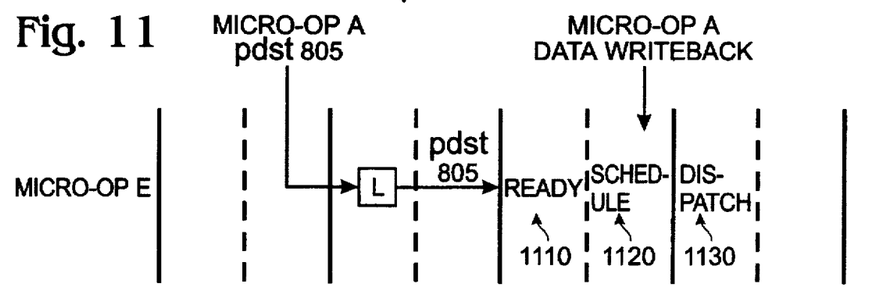
FIG. 11 shows another example of a micro-op which has been issued based on a speculatively issued load micro-op according to one embodiment of the present invention.

FIG. 11 shows another example of a micro-op which has been issued based on a speculatively issued load micro-op according to one embodiment of the present invention. A Pdst 805 for a micro-op A is shown, with the data corresponding to Pdst 805 being the remaining source data necessary for the dispatch of micro-op E. Given the provision of Pdst 805, in the first half of the clock cycle following Pdst 805, the Pdst 805 is latched (L) into the CAM1 circuitry 235 of the reservation station 135 and made available for one-cycle CAM matches from the CAM1 circuitry 235. A one-cycle CAM match then results in the Ready stage 1110 being entered by micro-op E. The situation where micro-op E is ready due to a one-cycle CAM match could result when, for example, the source register information is not available in time for a two-cycle CAM match, but is available in time for a one-cycle CAM match. By way of another example, multiple entries may be ready in a particular clock cycle but are not scheduled due to another entry being selected for dispatch; these multiple entries then have a one-cycle CAM match in the next clock cycle.

Micro-op E is then scheduled for dispatch 1120. However, if micro-op A results in a memory miss, then the data corresponding to Pdst 805 will not be available in time for micro-op E to make use of it. Thus, micro-op E is canceled.

In order to cancel micro-op E, the present invention prevents micro-op E from being dispatched. Thus, micro-op E will not yet reach its dispatch stage 1130. Micro-op E is prevented from being dispatched by generating cancel schedule signals which are input to qualifier 252 and are used to qualify the schedule signals from scheduler 250 in an analogous manner to that of micro-op D discussed above with reference to FIG. 10. In one implementation, these cancel schedule signals are generated by logically ANDing together the CAM 1 match bits and a data invalid signal (the inverse of the data valid signal) for this port.

Figure 12:
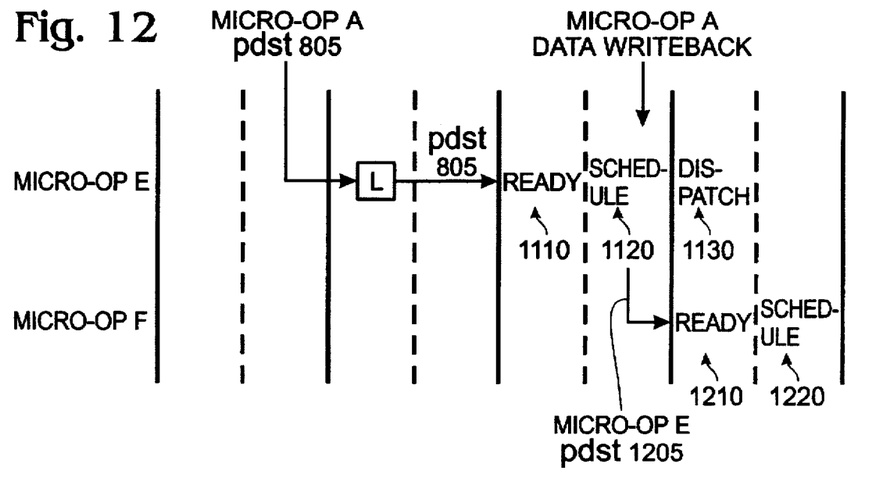
FIG. 12 shows another example of a micro-op which has been issued based on a speculatively issued load micro-op according to one embodiment of the present invention.

FIG. 12 shows another example of a micro-op which has been issued based on a speculatively issued load micro-op according to one embodiment of the present invention. A Pdst 805 for a micro-op A is shown, with the data corresponding to Pdst 805 being the remaining source data necessary for the dispatch of micro-op E. A Pdst 1205 for micro-op E is provided in the schedule stage 1120, resulting in a two-cycle CAM match occurring based on Pdst 1205 at the same time as ready stage 1210. The data corresponding to Pdst 1205 is the remaining source data necessary for the dispatch of micro-op F, so micro-op F would enter the schedule stage 1220 as shown.

However, the source data for micro-op F will not be available at the anticipated time if the data corresponding to Pdst 805 is not available in the expected location (for example, a memory miss occurs from micro-op A). Thus, micro-op F is canceled.

The present invention cancels micro-op F by canceling all CAM matches for micro-ops which are ready for dispatch due to a two-cycle CAM match from an internally bypassed Pdst on the same port as the bypass miss occurred. In one implementation, this is accomplished by logically ANDing together the Pdst valid bit together with the data invalid signal received from the MIU 125c. If the Pdst valid bit is set (that is, valid data is expected) and the data invalid signal is received (that is, the valid data isn't available when expected), then the two-cycle CAM match bit is inhibited for that clock cycle. Thus, the two-cycle CAM matches for the port corresponding to the bypass miss is canceled.

Figure 13:
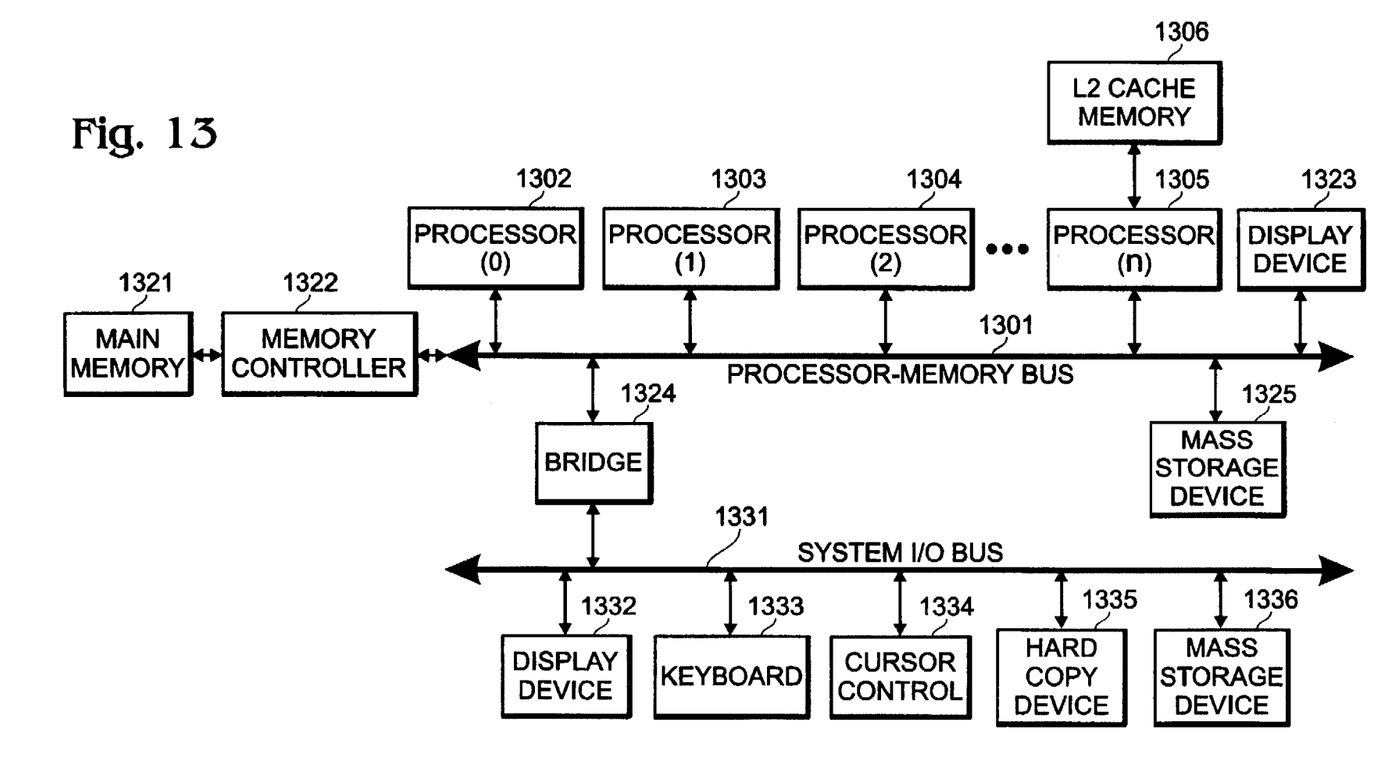
FIG. 13 shows an overview of an example multiprocessor computer system such as may be used with one embodiment of the present invention.

FIG. 13 shows an overview of an example multiprocessor computer system such as may be used with one embodiment of the present invention. The computer system generally comprises a processor-memory bus or other communication means 1301 for communicating information between one or more processors 1302, 1303, 1304 and 1305. The processor-memory bus 1301 includes arbitration, address, data and control buses (not shown). In one embodiment, the processors 1302 through 1305 each includes a small, extremely fast internal cache memory (not shown), commonly referred to as a level one (L1) cache memory for temporarily storing data and instructions on-chip. In addition, a bigger, slower level two (L2) cache memory 1306 can be coupled to any of the processors, such as processor 1305, for temporarily storing data and instructions for use by the processor. Each processor may have its own, optional L2 cache, or some may share an L2 cache.

Processors 1302, 1303, and 1304 may each be a parallel processor (a symmetric co-processor), such as a processor similar to or the same as processor 1305. Alternatively, processors 1302, 1303, or 1304 may be an asymmetric co-processor, such as a digital signal processor. In addition, processors 1302 through 1305 may be heterogeneous.

The processor-memory bus 1301 provides system access to the memory and input/output (I/O) subsystems. A memory controller 1322 is coupled to the processor-memory bus 1301 for controlling access to a random access memory (RAM) or other dynamic storage device 1321 (commonly referred to as a main memory) for storing information and instructions for processors 1302 through 1305. A mass data storage device 1325, such as a magnetic disk and disk drive, for storing information and instructions, and a display device 1323, such as a cathode ray tube (CRT), liquid crystal display (LCD), etc., for displaying information to the computer user may be coupled to the processor-memory bus 1301.

An input/output (I/O) bridge 1324 may be coupled to the processor-memory bus 1301 and a system I/O bus 1331 to provide a communication path or gateway for devices on either processor-memory bus 1301 or I/O bus 1331 to access or transfer data between devices on the other bus. Essentially, the bridge 1324 is an interface between the system I/O bus 1331 and the processor-memory bus 1301.

The I/O bus 1331 communicates information between peripheral devices in the computer system. Devices that may be coupled to the system bus 1331 include, for example, a display device 1332, such as a cathode ray tube, liquid crystal display, etc., an alphanumeric input device 1333 including alphanumeric and other keys, etc., for communicating information and command selections to other devices in the computer system (e.g., the processor 1302) and a cursor control device 1334 for controlling cursor movement. Moreover, a hard copy device 1335, such as a plotter or printer, for providing a visual representation of the computer images and a mass storage device 1336, such as a magnetic disk and disk drive, for storing information and instructions may also be coupled to the system bus 1331.

In certain implementations of the present invention, additional processors or other components or buses may be included. Additionally, in certain implementations components may be re-arranged. For example, the L2 cache memory 1306 may lie between the processor 1305 and the processor-memory bus 1301. Furthermore, certain implementations of the present invention may not require nor include all of the above components. For example, the processors 1302 through 1304, the display device 1323, or the mass storage device 1325 may not be coupled to the processor-memory bus 1301. Additionally, the peripheral devices shown coupled to the system I/O bus 1331 may be coupled to the processor-memory bus 1301; in addition, in some implementations only a single bus may exist with the processors 1302 through 1305, the memory controller 1322, and the peripheral devices 1332 through 1336 coupled to the single bus.

In one embodiment, the present invention is implemented in a microprocessor that executes the well-known Intel Architecture Microprocessor instruction set, such as the Intel Pentium Pro™ processor. The present invention may, however, be implemented in any microprocessor architecture in which instructions are speculatively dispatched. A variety of microprocessors may take advantage of the present invention whether those microprocessors occupy a single chip or more than one chip and regardless of the materials used to fabricate the chip including silicon or gallium arsenide.

In the descriptions above, the present invention is discussed as using micro-ops. It is to be appreciated, however, that these micro-ops are only one type of instruction which can be supported by the present invention, and that any of a wide variety of types of instructions can be used with the present invention.

Also in the descriptions above, the present invention is discussed as speculatively dispatching operations based on the expected return of data from a load operation at a predetermined time. It is to be appreciated, however, that the present invention is applicable to recovering any operations which are dispatched based on speculated results.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, a method and apparatus for recovering the state of a speculatively scheduled operation in a processor which cannot be executed at the speculated time has been described.

What is claimed is:

1. In a processor, a method for recovering an operation which has speculatively begun a series of stages for dispatching and executing the operation and which cannot be completed at a speculated time, the method comprising the steps of:
   (a) receiving a signal indicating that the operation cannot be completed at the speculated time;
   (b) canceling execution of the operation in response to the receiving of the signal, if the operation has been dispatched;
   (c) generating a bypass miss signal in response to the receiving of the signal; and
   (d) preventing the operation from dispatching, in response to the bypass miss signal, if the operation has not been dispatched.

2. The method of claim 1, further comprising the step of preventing an entry of a reservation station, corresponding to the operation, from being deallocated.

3. The method of claim 1, wherein the bypass miss signal corresponds to a port of a reservation station from which the operation was or was to be dispatched.

4. The method of claim 1, further comprising the step of preventing a second operation from being dispatched from a reservation station, the second operation being ready for dispatch due to a speculated return of data at the speculated time.

5. In a microprocessor, a method of providing operations for execution by one or more execution units, the method comprising the steps of:
   (a) dispatching a first operation, wherein the first operation is unable to return its corresponding data prior to a predetermined time;
   (b) determining a second operation is ready to be dispatched prior to the predetermined time, the determining being based on a speculated return of the data corresponding to the first operation;
   (c) canceling execution of the second operation if the second operation has been dispatched, wherein the canceling is responsive to the first operation being unable to return the data prior to the predetermined time;
   (d) generating a bypass miss signal responsive to the first operation being unable to return the data prior to the predetermined time; and
   (e) preventing the second operation from dispatching, responsive to the bypass miss signal, if the second operation has not been dispatched.

6. The method of claim 5, further comprising the step of preventing an entry of a reservation station, corresponding to the second operation, from being deallocated.

7. The method of claim 5, wherein the bypass miss signal corresponds to a port of a reservation station from which the second operation was or was to be dispatched.

8. The method of claim 5, further comprising the step of clearing a physical destination address match bit corresponding to the second operation responsive to the bypass miss signal.

9. The method of claim 5, further comprising the step of generating a cancel schedule signal responsive to the bypass miss signal.

10. The method of claim 9, further comprising the step of preventing a third operation from being scheduled responsive to the cancel schedule signal.

11. The method of claim 5, further comprising the step of preventing a third operation from being dispatched from a reservation station, the third operation being ready for dispatch due to the speculated return of data at the predetermined time from the first operation.

12. The method of claim 5, further comprising the step of returning the second operation to its state prior to being determined ready to be dispatched.

13. An apparatus in a microprocessor, the apparatus comprising:
   a reservation station to speculatively schedule and dispatch a first operation and also to speculatively determine a second operation is ready to be dispatched based on a speculated return of data at a predetermined time from the first operation, wherein the first operation is unable to return the data at the predetermined time; and
   a recovery mechanism to cancel the second operation and generate a bypass miss signal, provided the data from the first operation is not available at the predetermined time, wherein execution of the second operation is canceled if the second operation was dispatched, or wherein, in response to the bypass miss signal, the second operation is prevented from dispatching if the second operation has not been dispatched.

14. The apparatus of claim 13, wherein the recovery mechanism comprises:
   circuitry to prevent an entry in the reservation station corresponding to the second operation from being deallocated.

15. The apparatus of claim 13, wherein the recovery mechanism comprises:
   circuitry, responsive to the bypass miss signal, to prevent a valid bit corresponding to the entry in the reservation station from being cleared.

16. The apparatus of claim 13, wherein the recovery mechanism comprises:
   circuitry to clear a physical destination address match indicator corresponding to the second operation.

17. The apparatus of claim 13, wherein the recovery mechanism is also to prevent a third operation from being dispatched from the reservation station, the third operation being ready for dispatch due to the speculated return of data at the predetermined time from the first operation.

18. A computer system comprising:
   a bus; and
   a processor coupled to the bus, wherein the processor includes, a reservation station to speculatively schedule and dispatch a first operation and also to speculatively determine a second operation is ready to be dispatched based on a speculated return of data at a predetermined time from the first operation, wherein the first operation is unable to return the data at the predetermined time; and a recovery mechanism to cancel the second operation and generate a bypass miss signal, provided the data from the first operation is not available at the predetermined time, wherein execution of the second operation is canceled if the second operation was dispatched, or wherein, in response to the bypass miss signal, the second operation is prevented from dispatching if the second operation has not been dispatched.

19. The system of claim 18, wherein the recovery mechanism comprises:

circuitry to prevent an entry in the reservation station corresponding to the second operation from being deallocated.

20. The system of claim 18, wherein the recovery mechanism comprises:

circuitry, responsive to the bypass miss signal, to prevent a valid bit corresponding to the entry in the reservation station from being cleared.

21. The system of claim 18, wherein the recovery mechanism comprises:

circuitry to clear a physical destination address match indicator corresponding to the second operation.

22. The system of claim 18, wherein the recovery mechanism is also to prevent a third operation from being dispatched from the reservation station, the third operation being ready for dispatch due to the speculated return of data at the predetermined time from the first operation.

23. In a processor, an apparatus for recovering an operation which has speculatively begun a series of stages for dispatching and executing the operation and which cannot be completed at a speculated time, the apparatus comprising:

means for receiving a signal indicating that the operation cannot be completed at the speculated time;

means for canceling execution of the operation in response to the receiving of the signal, if the operation has been dispatched;

means for generating a bypass miss signal in response to the receiving of the signal; and means for preventing the operation from dispatching, in response to the bypass miss signal, if the operation has not been dispatched.

24. The apparatus of claim 23, further comprising:

means for preventing an entry of a reservation station, corresponding to the operation, from being deallocated.

25. The apparatus of claim 23, wherein the means for generating the bypass miss signal corresponds to a port of a reservation station from which the operation was or was to be dispatched.

26. The apparatus of claim 23, further comprising:

means for preventing a second operation from being dispatched from a reservation station, the second operation being ready for dispatch due to a speculated return of data at the speculated time.

* * * * *